(12) United States Patent
Wakabayashi

(10) Patent No.: US 8,159,643 B2
(45) Date of Patent: Apr. 17, 2012

(54) ELECTRIC FIELD DRIVING DEVICE AND ELECTRONIC APPARATUS

(75) Inventor: Junichi Wakabayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1067 days.

(21) Appl. No.: 12/040,103

(22) Filed: Feb. 29, 2008

(65) Prior Publication Data

US 2008/0225217 A1    Sep. 18, 2008

(30) Foreign Application Priority Data

Mar. 13, 2007 (JP) ................................. 2007-062970
Nov. 19, 2007 (JP) ................................. 2007-298917

(51) Int. Cl.
*G02F 1/1343* (2006.01)
(52) U.S. Cl. ...................................... 349/142; 349/141
(58) Field of Classification Search .................. 349/141, 349/142

See application file for complete search history.

(56) References Cited

U.S. PATENT DOCUMENTS

| 2005/0068483 | A1 | 3/2005 | Lee et al. |
| 2007/0002247 | A1 | 1/2007 | Lee |
| 2007/0024789 | A1 | 2/2007 | Itou et al. |
| 2007/0229748 | A1* | 10/2007 | Fujita ........................... 349/141 |

FOREIGN PATENT DOCUMENTS

JP    A 2002-296611    10/2002

OTHER PUBLICATIONS

Chou W-y et al.: "A Novel Design to Eliminate Fringe Field Effects for Liquid Crystal on Silicon," Japanese Journal of Applied Physics, Japan Society of Applied Physics, Tokyo, JP, vol. 41, No. 12, Part 01, Dec. 1, 2002.

* cited by examiner

*Primary Examiner* — Richard Kim
(74) *Attorney, Agent, or Firm* — Oliff & Berridge, PLC

(57) ABSTRACT

An electric field driving device, in which a plurality of pixels, each of which is formed of two or more sub-pixels that respectively correspond to different colors from one another, are arranged in a matrix in a pixel region on a substrate, includes pixel electrodes, a common electrode, an insulating layer, and a material. Each of the pixel electrodes is formed in correspondence with the sub-pixel on the substrate. The common electrode is formed above the pixel electrodes on the substrate so that at least part of the common electrode overlaps each of the pixel electrodes in plan view. The insulating layer is formed on the substrate between the pixel electrodes and the common electrode. The material is driven by an electric field that is generated on the basis of a difference in electric potential between each of the pixel electrodes and the common electrode. The common electrode has a plurality of slits that at least partly overlap the pixel electrodes in plan view. At least a portion of the slits are respectively provided continuously over a plurality of the sub-pixels. Each of the sub-pixels corresponding to the same color includes the same numbers of end portions of the plurality of slits.

3 Claims, 11 Drawing Sheets

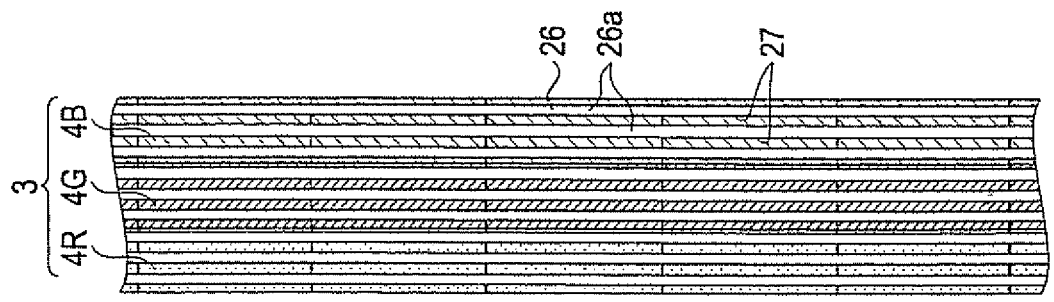
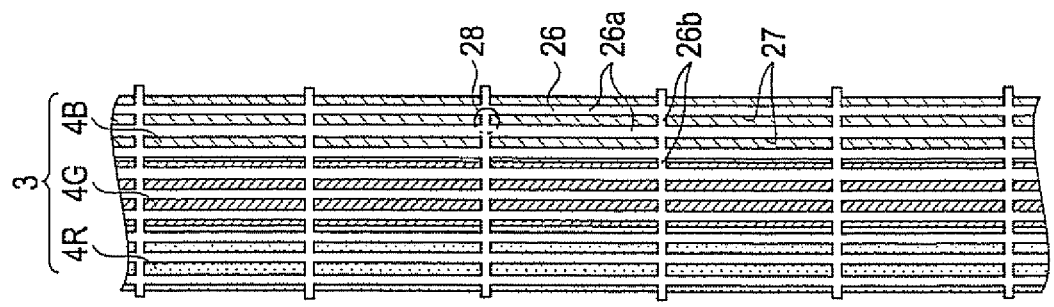
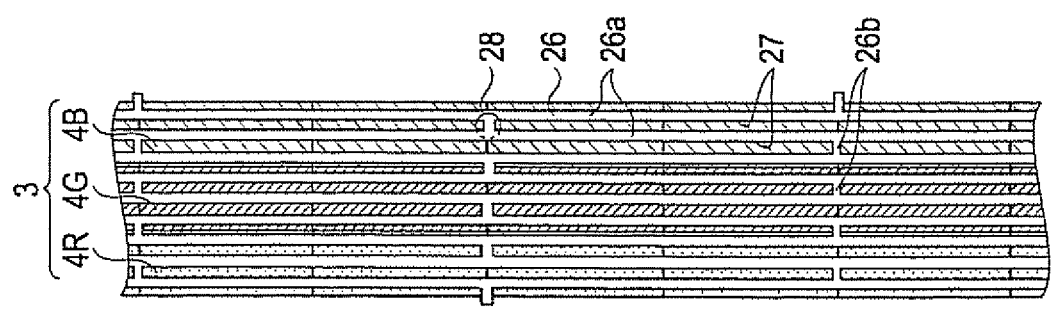
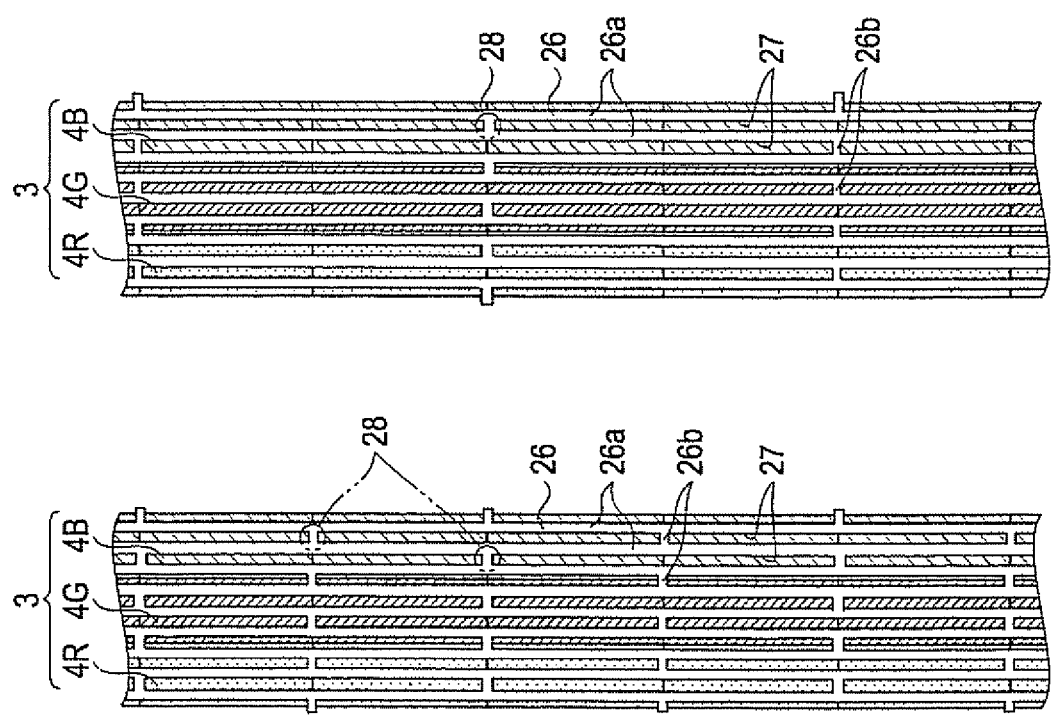

ELECTRIC FIELD DRIVING DEVICE AND ELECTRONIC APPARATUS

This application claims priority from Japanese Patent Application No. 2007-062970 filed in the Japanese Patent Office on Mar. 13, 2007, and Japanese Patent Application No. 2007-298917 filed in the Japanese Patent Office on Nov. 19, 2007, the entire disclosures of which are hereby incorporated by reference in its entirety.

BACKGROUND

1. Technical Field

The present invention relates to an electric field driving device and an electronic apparatus.

2. Related Art

A liquid crystal device is one of electric field driving devices and modulates transmitted light by driving a liquid crystal using an electric field. One embodiment of the liquid crystal device has been known as an FFS (Fringe Field Switching) mode liquid crystal device that drives a liquid crystal by a lateral electric field that is parallel to the substrates, which is described in JP-A-2002-296611. The liquid crystal device includes pixel electrodes and a common electrode. The pixel electrodes are provided on a face of one of the substrates, which faces the liquid crystal. The common electrode is laminated on the pixel electrodes via an insulating layer. Among these electrodes, the common electrode has a large number of slits formed therein. In the above described configuration, as a driving voltage is applied between the pixel electrodes and the common electrode, an electric field that has a line of electric force, extending from the upper face of the common electrode through the slits to the upper face of the pixel electrodes, is generated. At this time, liquid crystal molecules are driven by a component of the electric field, which is parallel to the substrates (lateral electric field) and generated above the common electrode, and thereby the alignment direction of the liquid crystal molecules are changed. In this manner, the FFS mode liquid crystal device drives the liquid crystal molecule and modulates incident light using the polarization conversion function.

The pixel region of the FFS mode liquid crystal device is, for example, collectively formed of sub-pixels that contribute to display corresponding to any one of red, green, and blue. Then, the lengths of slits provided in the common electrode are set smaller than the widths of the sub-pixels, and the slits are generally provided for each of the sub-pixels.

In the above described configuration, however, a large number of end portions of the slits (ends of the slits in the longitudinal direction) are included in each of the sub-pixels. For this reason, there is a problem that, in proximity to the above end portions of the slits, an electric field is disturbed and, thereby, an alignment state of the liquid crystal is disturbed to thereby produce a domain, or the like, resulting in a decrease in display quality. In addition, when the number of end portions of the slits is different among a plurality of the sub-pixels corresponding to the same color, there occurs a problem that the display quality varies because a disturbance of an electric field is different among the sub-pixels.

SUMMARY

An advantage of some aspects of the invention is to implement the following aspects or application examples.

FIRST APPLICATION EXAMPLE

An aspect of the invention provides an electric field driving device in which a plurality of pixels, each of which is formed of two or more sub-pixels that respectively correspond to different colors from one another, are arranged in a matrix in a pixel region on a substrate. The electric field driving device includes pixel electrodes, a common electrode, an insulating layer, and a material. Each of the pixel electrodes is formed in correspondence with the sub-pixel on the substrate. The common electrode is formed above the pixel electrodes on the substrate so that at least part of the common electrode overlaps each of the pixel electrodes in plan view. The insulating layer is formed on the substrate between the pixel electrodes and the common electrode. The material is driven by an electric field that is generated on the basis of a difference in electric potential between each of the pixel electrodes and the common electrode. The common electrode has a plurality of slits that at least partly overlap the pixel electrodes in plan view. At least a portion of the slits are respectively provided continuously over a plurality of the sub-pixels. Each of the sub-pixels corresponding to the same color includes the same numbers of end portions of the plurality of slits.

According to the above configuration, the slits extend continuously over a plurality of the sub-pixels, so that, in comparison with the configuration in which the slits are provided separately for each sub-pixel, it is possible to reduce the number of end portions of the slits that disturb an electric field. In this manner, it is possible to improve the display quality of the electric field driving device. In addition, the number of end portions of the slits included in each of the sub-pixels corresponding to the same color is made equal, so that there is no difference in disturbance of an electric field due to the end portions of the slits among the sub-pixels corresponding to the same color. Thus, it is possible to prevent a decrease in display quality due to chrominance non-uniformity, roughness, or the like. Note that, in the description, the end portions of the slit mean ends of the slit in the longitudinal direction. Accordingly, when the common electrode may be regarded as an electrode that is formed of strip portions that extend along one of the sides of the sub-pixel (extend along the longitudinal direction of the slit) and connecting portions that connect the adjacent strip portions, portions in proximity to the connecting portions correspond to the end portions of the slits.

SECOND APPLICATION EXAMPLE

In the above electric field driving device, the pixel region may be configured so that a pixel block formed of m pixels that are arranged along the longitudinal direction of the slits is set as a minimum unit for repeated arrangement, wherein the common electrode may have m×n slits in each of the sub-pixels, and wherein each of the slits may have a length that is substantially equal to the width of the pixel block and the end portions of the slits may be arranged so as to coincide with a boundary between the adjacent pixels. Then, m is natural number and equal to or more than two, and n is a maximum number of end portions of the slits included in each of the sub-pixels.

According to the above configuration, the same numbers (up to n) of end portions of the slits are arranged in each of the sub-pixels corresponding to the same color. In other words, n end portions of the slits are arranged in each of the sub-pixels that are arranged at both sides of each pixel. Thus, each of the pixels equally includes 2n end portions of the slits. In this manner, there is no difference in disturbance of an electric field due to the end portions of the slits among the sub-pixels corresponding to the same color. Thus, it is possible to prevent a decrease in display quality due to chrominance non-uniformity, roughness, or the like.

THIRD APPLICATION EXAMPLE

In the above electric field driving device, positions of the end portions of the slits, which are arranged in each of the sub-pixels, may be in symmetry in a direction perpendicular to the longitudinal direction of the slits.

According to the above configuration, a disturbance of an electric field is not clustered on the upper or lower side of each sub-pixel. Thus, it is possible to prevent a decrease in display quality due to chrominance non-uniformity, roughness, or the like. In the above description, the word upper or lower indicates a direction perpendicular to the longitudinal direction of the slits.

FOURTH APPLICATION EXAMPLE

In the above electric field driving device, the end portions of the slits may be arranged so as to coincide with a boundary between the adjacent pixels, wherein each of the pixels at least may include the end portions of the two adjacent slits provided in the pixel, and wherein the end portions may be respectively located at opposite sides of the pixel.

According to the above configuration, the positions of the end portions of the adjacent slits may be configured to be offset by one pixel. Thus, between the adjacent pixels, it is less likely to abruptly change a position at which a disturbance of an electric field is produced. Thus, it is possible to prevent a decrease in display quality due to chrominance non-uniformity, roughness, or the like.

FIFTH APPLICATION EXAMPLE

In the above electric field driving device, the end portions of the slits may be arranged so as to coincide with a boundary between the adjacent sub-pixels, wherein at least a portion of the slits may have a length that is equal to or larger than the width of four sub-pixels.

According to the above configuration, the at least portion of the slits continuously extend over at least four sub-pixels. Thus, in the two sub-pixels of these four sub-pixels, excluding both ends, each of the slits is formed to continuously extend from one end of the two sub-pixels to the other end opposite the one end. As a result, the number of end portions of the slits that disturb an electric field is reduced. In addition, the end portions of the slits are arranged so as to coincide with a boundary between the adjacent sub-pixels, so that it is impossible to prevent a disturbance of an electric field from being produced in proximity to the central portion of each sub-pixel. In this manner, it is possible to improve the display quality and/or improve the transmittance ratio.

SIXTH APPLICATION EXAMPLE

In the above electric field driving device, each of the pixels may be formed of at least four sub-pixels that respectively correspond to different colors from one another and that are arranged along the longitudinal direction of the slits.

According to the above configuration, in the electric field driving device that includes pixels, each of which is formed of sub-pixels that respectively correspond to four or more colors, by reducing the number of end portions of the slits, it is possible to achieve improvement in transmittance ratio and/or improvement in display quality.

SEVENTH APPLICATION EXAMPLE

In the above electric field driving device, each of the slits may have a length that is substantially equal to the width of the pixel, wherein the end portions of the slits may be arranged so as to coincide with a boundary between the adjacent pixels.

According to the above configuration, each of the slits continuously extends over all the sub-pixels included in each of the pixels, but does not continuously extend to the pixel adjacent thereto. Therefore, each of the pixels has the slits, each of which has four sides that are surrounded by the members of the common electrode and which are separately formed in each of the pixels. Thus, the layout of the members, including the common electrode, in the pixel region is configured so that the pixel is set as a minimum unit for repeated arrangement. Thus, the number of end portions of the slits included in each of the pixels is reduced to improve the transmittance ratio and/or improve the display quality, while making it possible to easily design the pixel region.

EIGHTH APPLICATION EXAMPLE

An aspect of the invention provides an electric field driving device in which a plurality of sub-pixels are arranged in a matrix in a pixel region on a substrate. The electric field driving device includes pixel electrodes, a common electrode, and a material. Each of the pixel electrodes is formed in correspondence with the sub-pixel. The common electrode is laminated on the pixel electrodes via an insulating layer. The material is driven by an electric field that is generated on the basis of a difference in electric potential between each of the pixel electrodes and the common electrode. The common electrode has a plurality of slits. The plurality of slits include at least two slits that are parallel to each other. The at least two parallel slits are formed continuously in the pixel region.

According to the above configuration, because there are no end portions of the slits (ends of the slits in the longitudinal direction) that disturb an electric field in the pixel region, it is possible to suppress a disturbance of an electric field in the pixel region. In addition, because there is no end portions of the slits in each of the sub-pixels, the effective display area is the same among the sub-pixels and the width of a region that does not contribute to display between the adjacent sub-pixels (a region between the adjacent pixels) is also the same. Thus, it is possible to prevent a decrease in display quality due to chromillance non-uniformity, roughness, or the like. Furthermore, even when the sub-pixels that respectively correspond to different colors are provided, there is no difference in disturbance of an electric field due to the end portions of the slits among the sub-pixels corresponding to the same color. Thus, it is possible to prevent a decrease in display quality due to chrominance non-uniformity, roughness, or the like. According to the above configuration, it is less likely that a decrease in image quality occurs because of a disturbance of an electric field and, hence, the electric field driving device that has a high transmittance ratio is obtained.

NINTH APPLICATION EXAMPLE

In the above electric field driving device, dummy pixels may be further provided outside the pixel region so as to be arranged adjacent to the pixel region, wherein at least a portion of the slits may continuously extend from the inside of the pixel region to the dummy pixels.

According to the above configuration, it is possible to uniform a disturbance of an electric field between the sub-pixels that are arranged at the outermost side of the pixel region and the other sub-pixels that are arranged in the pixel region.

TENTH APPLICATION EXAMPLE

In the above electric field driving device, the material may be a liquid crystal, wherein an angle that an alignment direction of the liquid crystal, when no voltage is applied, makes with the longitudinal direction of the slits may be equal to or more than one degree and equal to or less than ten degrees.

In this manner, it is possible to rotate liquid crystal molecules in the same rotational direction when a driving voltage is applied between the pixel electrode and the common electrode. Thus, it is possible to suppress generation of a domain due to ununiform rotational directions of the liquid crystal molecules.

ELEVENTH APPLICATION EXAMPLE

In the above electric field driving device, the common electrode may be electrically connected to a wiring that supplies a common electric potential outside the pixel region.

According to the above configuration, without reducing the effective display area of the pixel region, it is possible to supply a common electric potential to the common electrode.

TWELFTH APPLICATION EXAMPLE

In the above electric field driving device, a scanning line or scanning lines that are arranged parallel to the longitudinal direction of the slits in the pixel region may be further provided.

According to the above configuration, it is possible to arrange the scanning line or scanning lines without reducing the effective display area in the pixel region.

THIRTEENTH APPLICATION EXAMPLE

An aspect of the invention provides an electric field driving device in which a plurality of pixels, each of which is formed of two or more sub-pixels that respectively correspond to different colors from one another, are arranged in a matrix in a pixel region on a substrate. The electric field driving device includes pixel electrodes, a common electrode, an insulating layer and a material. Each of the pixel electrodes is formed in correspondence with the sub-pixel on the substrate. The common electrode is formed above the pixel electrodes on the substrate so that at least part of the common electrode overlaps each of the pixel electrodes in plan view. The insulating layer is formed on the substrate between the pixel electrodes and the common electrode. The material is driven by an electric field that is generated on the basis of a difference in electric potential between each of the pixel electrodes and the common electrode. The common electrode has strip portions, connecting portions, and a plurality of slits. Each of the connecting portions connects the adjacent strip portions. Each of the plurality of slits is surrounded by the strip portions and the connecting portions. At least a portion of the slits overlap the pixel electrodes in plan view. Each of the sub-pixels that correspond to the same color includes the same numbers of the connecting portions. The number of the connecting portions included in each of the pixels, where the number of the strip portions included in the pixel is p and the number of the sub-pixels included in the pixel is q, is smaller than $(p-1)\times(q+1)$.

According to the above configuration, because the number of connecting portions included in each of the pixels is smaller than $(p-1)\times(q+1)$, at least a portion of the slits continuously extend over the plurality of sub-pixels. Thus, in comparison with the configuration in which the slits are provided separately for each sub-pixel, it is possible to reduce the number of end portions of the slits that disturb an electric field. In this manner, it is possible to improve the display quality of the electric field driving device. In addition, the number of end portions of the slits included in each of the sub-pixels corresponding to the same color is made equal, so that there is no difference in disturbance of an electric field due to the end portions of the slits among the sub-pixels corresponding to the same color. Thus, it is possible to prevent a decrease in display quality due to chrominance non-uniformity, roughens, or the like.

FOURTEENTH APPLICATION EXAMPLE

An aspect of the invention provides an electronic apparatus that uses the electric field driving device as a display portion.

According to the above configuration, the electronic apparatus that has a high transmittance ratio and that is able to perform high-quality display may be obtained.

BRIEF DESCRIPTION OF THE DRAWINGS

The invention will be described with reference to the accompanying drawings wherein like numbers reference like elements.

FIG. 15A to FIG. 15D are plan views that specifically show a portion of the pixel region of a liquid crystal device according to a sixth embodiment;

DETAILED DESCRIPTION OF EMBODIMENTS

Figure 1A:
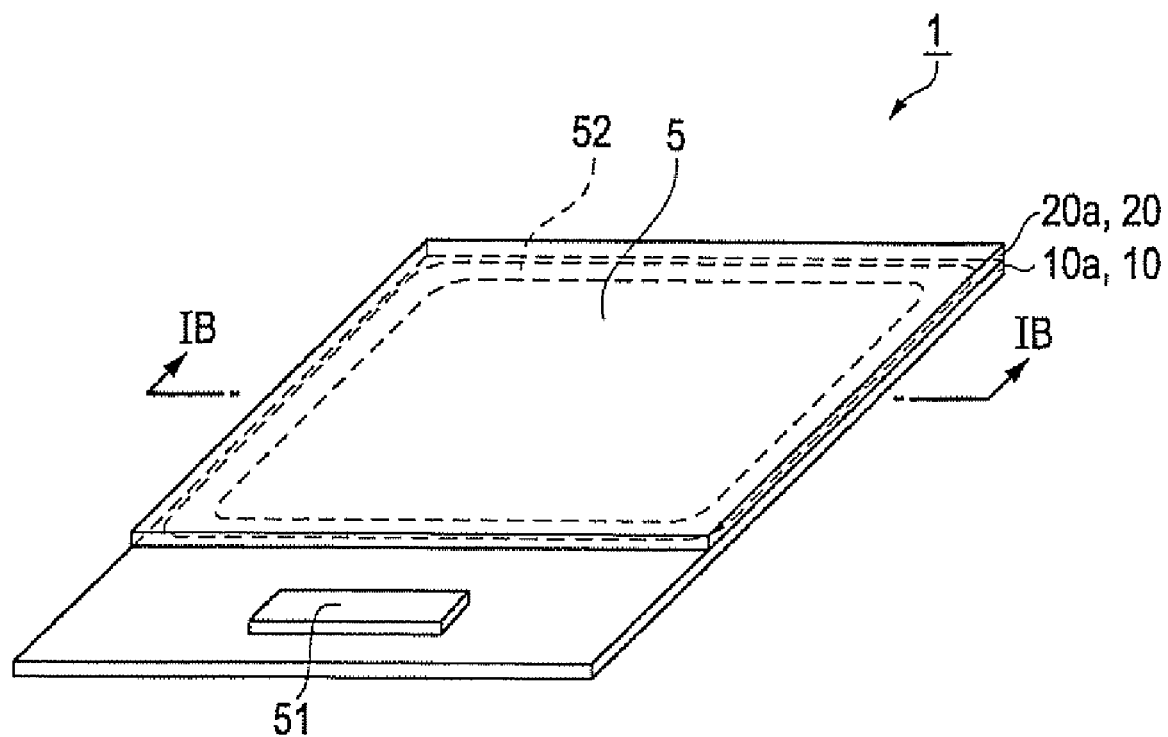
FIG. 1A is a schematic perspective view of a liquid crystal device, which serves as an electric field driving device.

Hereinafter, embodiments of an electric field driving device and an electronic apparatus will be described with reference to the accompanying drawings. Note that, in the accompanying drawings, to make it easier to recognize the components in the drawings, the dimensions and ratio of the components are appropriately varied from those of the actual components.

First Embodiment

Figure 1B:
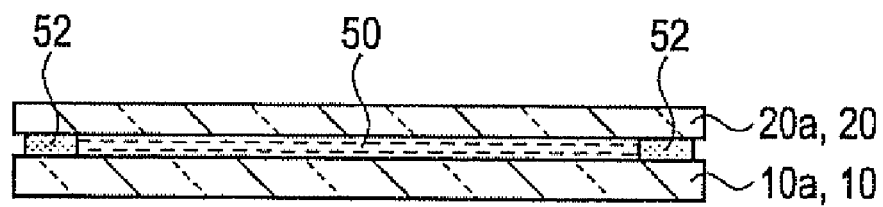
FIG. 1B is a cross-sectional view that is taken along the line IB-IB in FIG. 1A.

FIG. 1A is a schematic perspective view of a liquid crystal device, which serves as an electric field driving device, and FIG. 1B is a cross-sectional view that is taken along the line IB-IB in FIG. 1A. The liquid crystal device 1 includes an element substrate 10a and an opposite substrate 20a, which are opposed and adhered to each other through a frame-shaped seal material 52. The element substrate 10a includes a glass substrate 10 as a one substrate, and the opposite substrate 20a includes a glass substrate 20. A liquid crystal 50 is sealed in a space surrounded by the element substrate 10a, the opposite substrate 20a and the seal material 52. The element substrate 10a is larger than the opposite substrate 20a, and is adhered to the opposite substrate 20a in a state where part of the element substrate 10a extends beyond the outer periphery of the opposite substrate 20a. A driver IC 51 that drives the liquid crystal 50 is mounted on the above extended portion. The liquid crystal 50 corresponds to a "material that is driven by an electric field that is generated by a difference in electric potential between the pixel electrodes and the common electrode."

A large number of sub-pixels 4 (see FIG. 2) that contribute to image display are arranged in a matrix in a region in which the liquid crystal 50 is sealed. Hereinafter, the region that is collectively formed of the sub-pixels 4 is termed as a pixel region 5.

Figure 2:
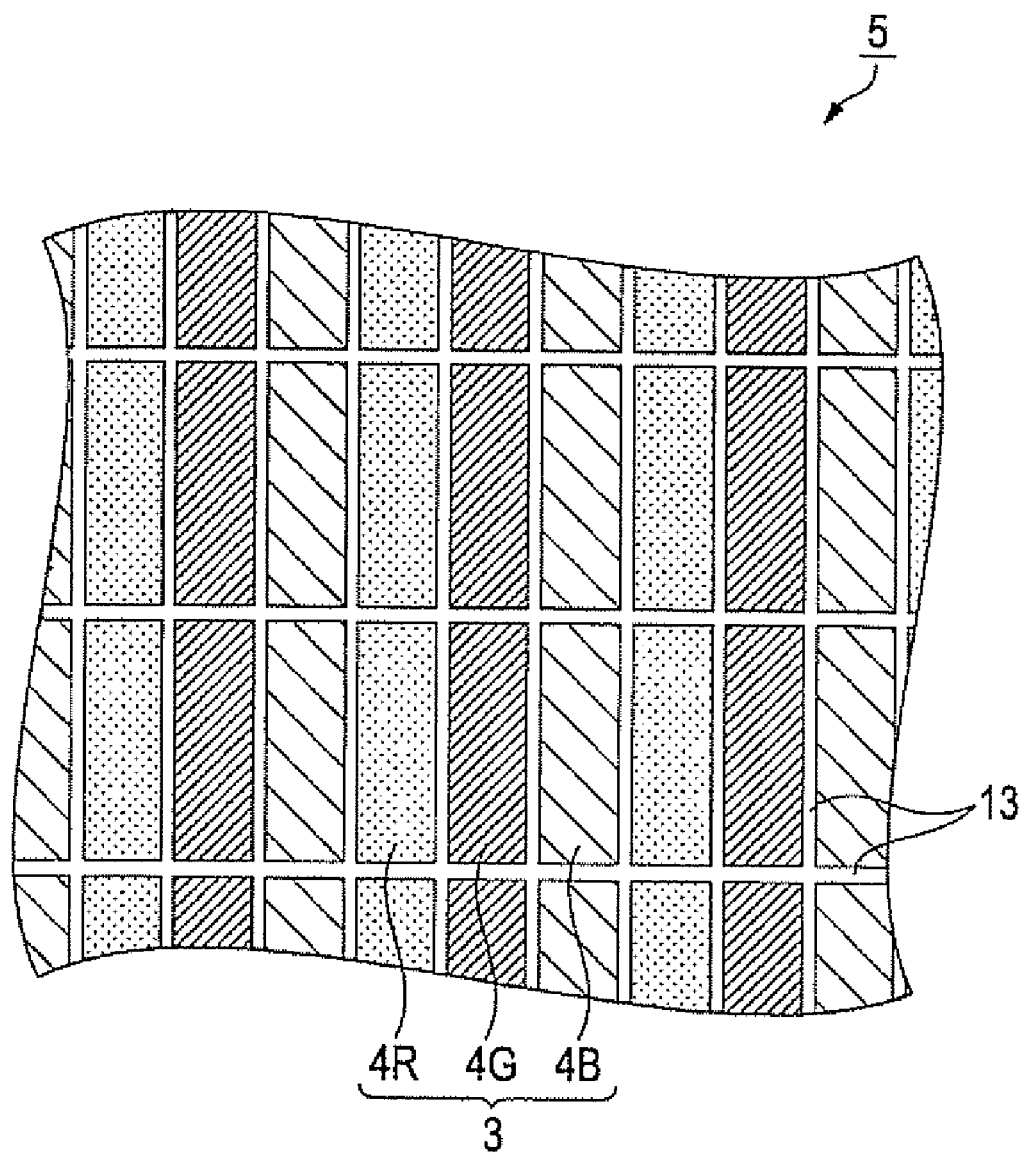
FIG. 2 is an enlarged plan view of a pixel region.

FIG. 2 is an enlarged plan view of the pixel region 5. A large number of the rectangular sub-pixels 4 are arranged in the pixel region 5. Each of the sub-pixels 4 contributes to color display of one of red, green and blue. Hereinafter, the sub-pixels that display red, green and blue colors are particularly termed as sub-pixels 4R, 4G, 4B, respectively. In FIG. 1B, a light shielding layer 13 and color filters (not shown) are formed on the surface, adjacent to the liquid crystal 50, of the glass substrate 20 that constitutes the opposite substrate 20a. The light shielding layer 13 is formed between any adjacent sub-pixels 4. The color filters are formed of resin that is able to color the transmitted light by absorbing a specific wavelength component of incident light. The red, green and blue color filters are arranged in the sub-pixels 4R, 4G, 4B, respectively. Hereinafter, even when any one of the sub-pixels 4R, 4G, 4B is specified, a sub-pixel may be simply termed as "sub-pixel 4" when it is not necessary to specify the corresponding color.

The sub-pixels 4 are arranged in a matrix. Hereinafter, the directions that define the matrix of the sub-pixels 4, that is, two orthogonal directions in which the adjacent sub-pixels 4 are arranged are termed as row direction and column direction. The sub-pixels 4 that are arranged in a certain column all have the same color. In other words, the sub-pixels 4 are arranged so that the corresponding colors are aligned in a stripe. In addition, each pixel 3 is formed of a set of three adjacent sub-pixels 4R, 4G, 4B that are aligned in the row direction. The pixel 3 is a minimum unit (pixel) of display. The liquid crystal device 1 is able to display various colors by adjusting the balance of luminance of the sub-pixels 4R, 4G, 4B in each pixel 3.

Figure 3:
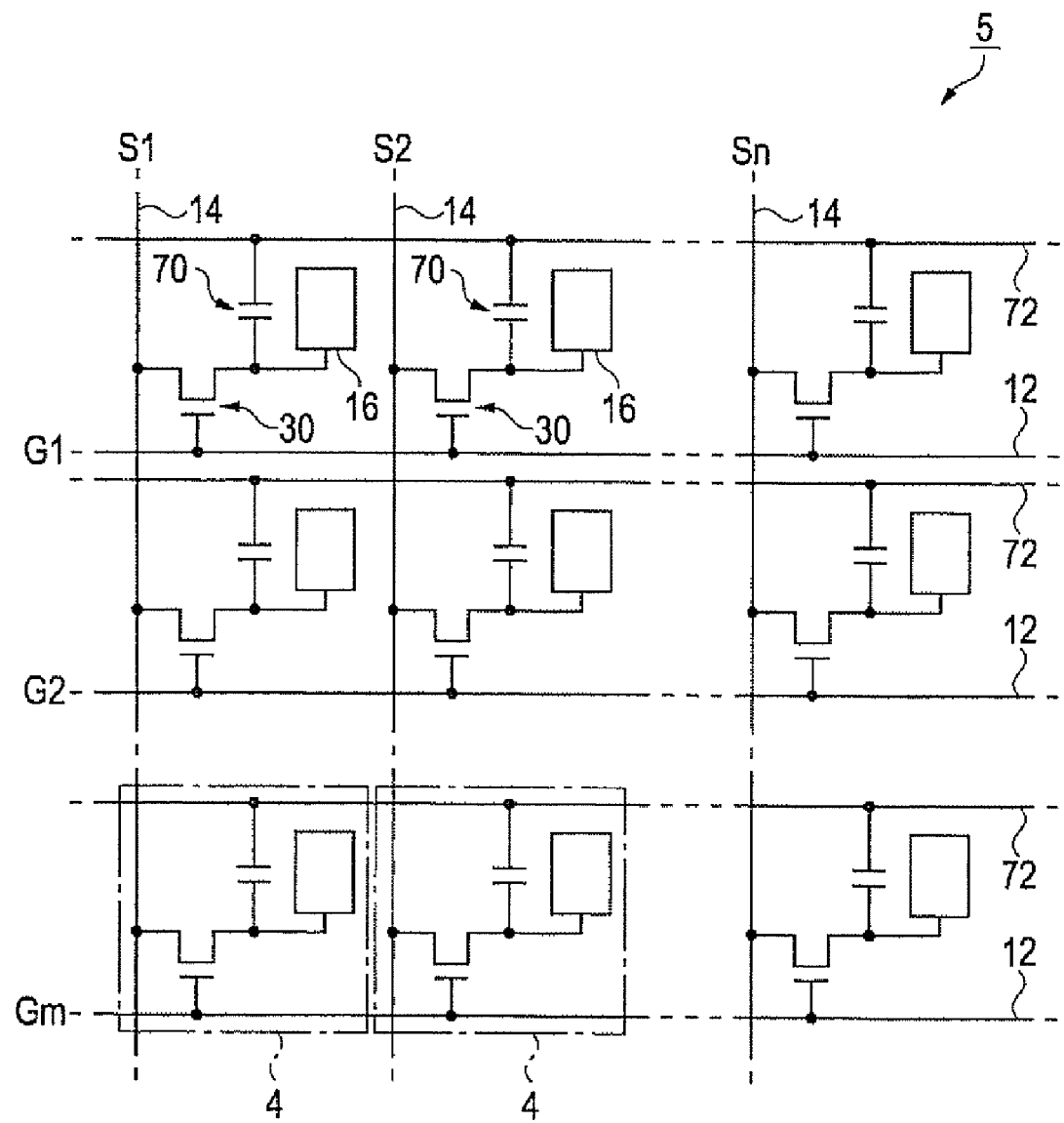
FIG. 3 is an equivalent circuit diagram of various elements, wirings, and the like, provided in a plurality of sub-pixels that constitute the pixel region.

FIG. 3 is an equivalent circuit diagram of various elements, wirings, and the like, provided in the plurality of sub-pixels 4 that constitute the pixel region 5. In the pixel region 5, a plurality of gate electrode lines 12 and a plurality of signal lines 14 are wired so as to intersect with one another, and pixel electrodes 16 are arranged in a matrix in regions that are defined by the gate electrode lines 12 and the signal lines 14. Then, a TFT (Thin Film Transistor) 30 is arranged for each of the sub-pixels 4 in proximity to a position of intersection of the corresponding gate electrode line 12 and the corresponding signal line 14. In addition, the pixel electrode 16 is electrically connected to the drain region of each TFT 30. The gate electrode line 12 corresponds to a scanning line.

The TFTs 30 turn on by ON signals included in scanning signals G1, G2, . . . , Gm supplied from the gate electrode lines 12, and, at this time, supply the corresponding pixel electrodes 16 with image signals S1, S2, . . . , Sn supplied to the signal lines 14. Then, as an electric field corresponding to a voltage applied between the pixel electrode 16 and the common electrode 26 (see FIG. 4 and FIG. 5) is applied to the liquid crystal 50, the alignment state of the liquid crystal 50 changes. The liquid crystal device 1 performs displaying by modulating transmitted light using a polarization conversion function based on the alignment state of the liquid crystal 50 and a polarization selection function of a polarizer (not shown) arranged on the outer side of the liquid crystal device 1.

A storage capacitor 70 is electrically connected to the drain region of each TFT 30 in parallel with the corresponding pixel electrode 16. Each of the storage capacitors 70 is electrically connected to a capacitor line 72 that is set to a constant electric potential. By means of the storage capacitors 70, the voltages of the pixel electrodes 16 are maintained over a period of time that is, for example, three digits longer than a period of time during which a source voltage is applied. When the voltage holding characteristic is thus improved, the contrast ratio of display is improved. The above various elements, wirings, and the like, are formed mainly on the element substrate 10a.

Figure 4:
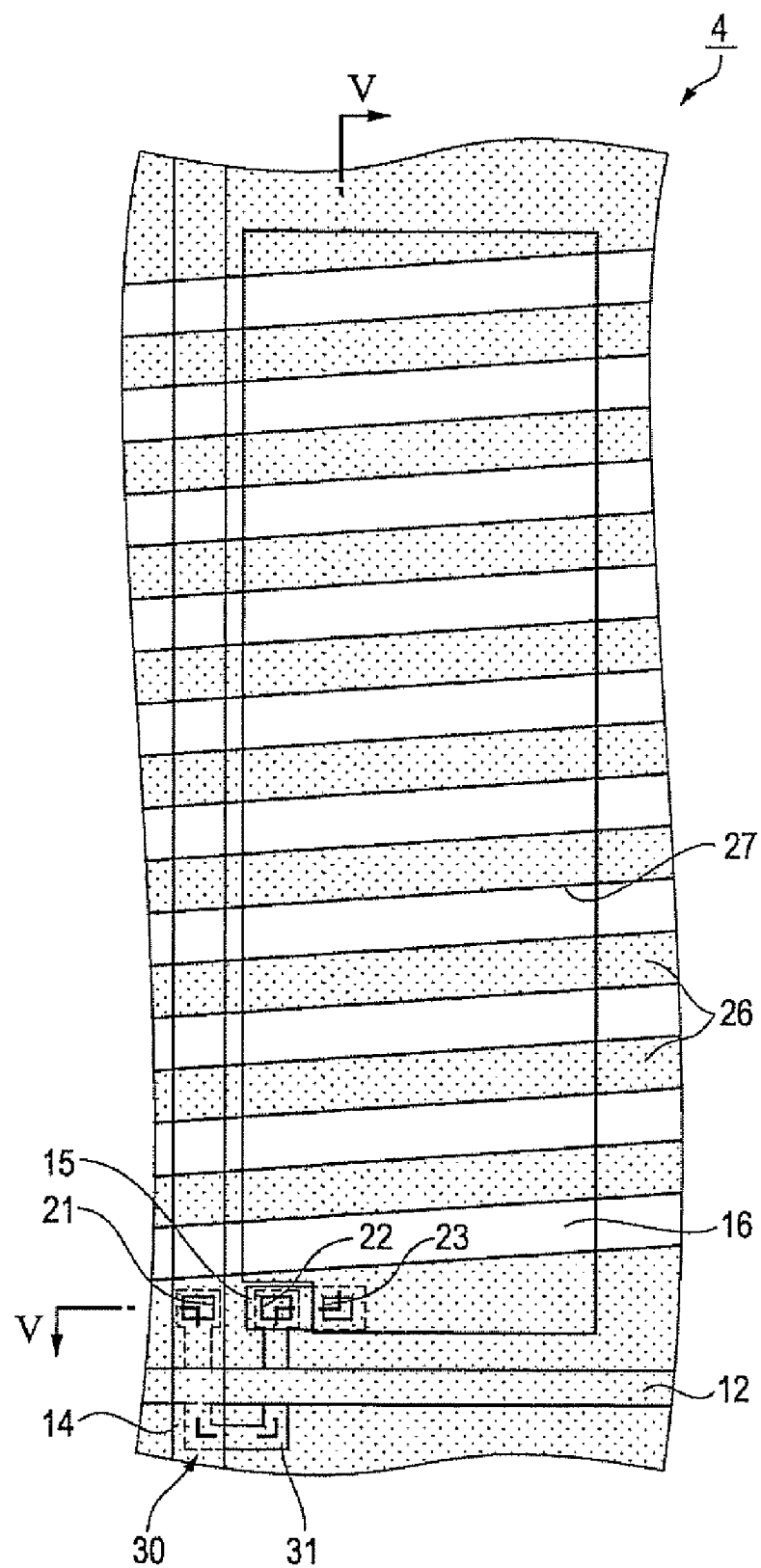
FIG. 4 is a plan view that specifically shows a portion corresponding to one sub-pixel formed in an element substrate.
Figure 5:
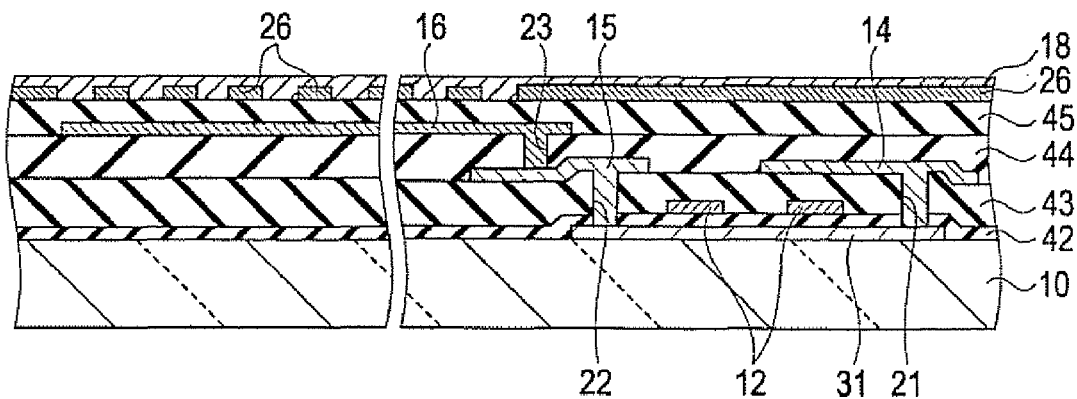
FIG. 5 is a cross-sectional view that is taken along the line V-V in FIG. 4.

Next, components of each sub-pixel 4 will be described with reference to FIG. 4 and FIG. 5. FIG. 4 is a plan view that specifically shows a portion corresponding to one sub-pixel 4 formed in the element substrate 10a. FIG. 5 is a cross-sectional view that is taken along the line V-V in FIG. 4. In the following description, "upper layer" or "lower layer" indicates a layer that is formed relatively on the upper side or on the lower side in FIG. 5.

As shown in FIG. 4, the gate electrode line 12 and the signal line 14 are arranged to intersect with each other in the sub-pixel 4, and the TFT 30 is formed at a position corresponding to the intersection. In addition, the substantially rectangular pixel electrode 16 is electrically connected to the TFT 30.

As shown in FIG. 5, a semiconductor layer 31 is laminated on the glass substrate 10. The semiconductor layer 31 may be, for example, formed of a polysilicon layer, and includes a channel region, in which a channel is formed by an electric field from the gate electrode line 12, and a source region and a drain region, which interpose the channel region therebetween. In addition, in order to further reduce a leakage current, the semiconductor layer 31 preferably has an LDD (lightly doped drain) structure in which a lightly doped region is partly provided in the source region and in the drain region. A base insulating film, or the like, may be further formed between the semiconductor layer 31 and the glass substrate 10.

In the upper layer formed on the semiconductor layer 31, the gate electrode line 12 formed of a high melting point metal, such as titanium, chromium, tungsten, tantalum, and molybdenum, or an alloy containing one of these metals is laminated via a gate insulating film 42 formed of silicon oxide, or the like. The gate electrode line 12 is arranged parallel to the longitudinal direction of slits 27 of the common electrode 26, which will be described later. The TFT 30 is formed of the above semiconductor layer 31, the gate insulating film 42, and the gate electrode line 12. The semiconductor layer 31 according to the present embodiment has a U shape as viewed in the direction of normal to the glass substrate 10, and the gate electrode line 12 is formed in a direction that crosses the U-shaped portion of the semiconductor layer 31. Thus, the TFT 30 has a double gate structure in which the gate electrode line 12 and the semiconductor layer 31 are opposite each other at different positions.

In the upper layer formed on the gate electrode line 12, the signal line 14 is laminated via an interlayer insulating film 43 formed of silicon oxide, or the like. The signal line 14 is formed of metal, such as aluminum, chromium, and tungsten, or an alloy containing one of these metals, and has a light shielding property. The signal line 14 is, as shown in FIG. 4, arranged so as to be perpendicular to the gate electrode line 12, and is electrically connected to the semiconductor layer 31 at one of distal ends of the U-shaped portion. More specifically, the signal line 14 is electrically connected to the source region of the semiconductor layer 31 through a contact hole that is provided to extend through the gate insulating film 42 and the interlayer insulating film 43.

A relay electrode 15 formed of the same material as that of the signal line 14 is formed in the same layer as the signal line 14. The relay electrode 15 is electrically connected to the drain region of the semiconductor layer 31 through a contact hole 22 that is provided to extend through the gate insulating film 42 and the interlayer insulating film 43 at the other distal end of the U-shaped portion.

In the upper layer formed on the signal line 14 and the relay electrode 15, the pixel electrode 16 formed of translucent ITO (indium tin oxide) is laminated via an interlayer insulating film 44 formed of silicon oxide. The pixel electrode 16 is electrically connected to the relay electrode 15 through a contact hole 23 that is formed in the interlayer insulating film 44. Thus, the pixel electrode 16 is electrically connected to the drain region of the semiconductor layer 31 through the relay electrode 15.

In the upper layer formed on the pixel electrode 16, the translucent common electrode 26 formed of ITO is formed via an interlayer insulating film 45, which serves as an insulating layer and is formed of silicon oxide, or the like. The common electrode 26 is arranged in strip regions that are indicated by dots in FIG. 4. That is, the common electrode 26 is formed on the pixel electrode 16 so that at least part of the common electrode 26 overlaps the pixel electrode 16 in plan view. In addition, the interlayer insulating film 45 is formed between the pixel electrode 16 and the common electrode 26. A large number of the slits 27 that are parallel to the short side of the sub-pixel 4 are provided at a portion of the common electrode 26, which overlaps the pixel electrode 16 in plan view. In other words, the slits 27 are arranged parallel to a horizontal array direction (row direction or extending direction of the short side) in which the plurality of sub-pixels 4 are arranged in a matrix. The slits 27 are parallel to one another and are arranged at constant intervals. In FIG. 4, all the slits 27 that are arranged in the sub-pixel 4 are parallel to one another; however, it is applicable that at least two slits 27 that are parallel to each other are included in the sub-pixel 4 and other slits that are not parallel to these two slits 27 may be further provided. Here, the pixel electrode 16, the common electrode 26 and the interlayer insulating film 45 held between the electrodes serve as the storage capacitor 70 shown in FIG. 3. In addition, the interlayer insulating film 45 corresponds to an insulating layer.

An alignment layer 18 formed of polyimide is laminated on the common electrode 26. The alignment layer 18 is a member that is in contact with the liquid crystal 50 (see FIG. 1B). By rubbing the alignment layer 18, it is possible to align the liquid crystal 50 along the direction of rubbing when no driving voltage is applied. An angle that the rubbing direction (that is, the alignment direction of the liquid crystal 50 when no voltage is applied) makes with the longitudinal direction of the slits 27 is preferably equal to or larger than one degree and equal to or lower than 10 degrees. In this manner, as will be described later, it is possible to rotate the liquid crystal molecules 50*a* (see FIG. 6) in the same rotational direction when a driving voltage is applied between the pixel electrode 16 and the common electrode 26. Thus, it is possible to suppress generation of a domain due to ununiform rotational directions of the liquid crystal molecules.

Figure 6:
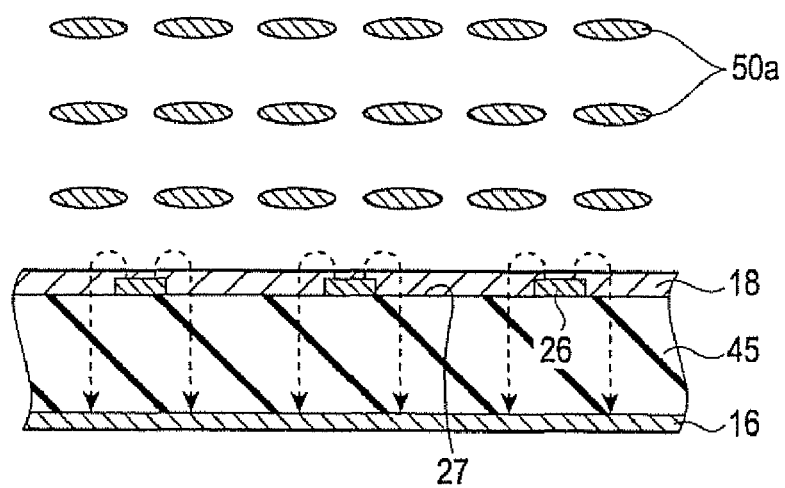
FIG. 6 is a schematic view that shows the state of an electric field that is generated when a driving voltage is applied between a common electrode and a pixel electrode.

FIG. 6 is a schematic view that shows the state of an electric field that is generated when a driving voltage is applied between the common electrode 26 and the pixel electrode 16 in the above described configuration. When the driving voltage is applied and a difference in electric potential is produced between the common electrode 26 and the pixel electrode 16, an electric field that has a line of electric force, extending from the upper face of the common electrode 26 through the slits 27 to the upper face of the pixel electrode 16, is generated. At this time, above the common electrode 26, that is, in the layer of the liquid crystal 50, an electric field that is parallel to the glass substrate 10 is generated. The liquid crystal molecules 50*a* contained in the liquid crystal 50 change their alignment directions in a plane parallel to the glass substrate 10 in accordance with the lateral electric field. As a result, the relative angle of the liquid crystal molecules 50*a* with respect to the polarization axes of polarizers (not shown) arranged respectively outside the element substrate 10*a* and the opposite substrate 20*a* change and, thereby, transmitted light is modulated on the basis of the polarization conversion function in accordance with the relative angle.

The above described liquid crystal mode is termed as an FFS mode. In the FFS mode, the liquid crystal molecules are always maintained in a substantially parallel relation to the glass substrate 10, so that it is possible to reduce a variation in retardation in accordance with a viewing angle and possible to perform displaying with a wide viewing angle.

Note that, when the slits 27 provided in the common electrode 26 have end portions (ends of the slits 27 in the longitudinal direction), an electric field generated in proximity to the end portions differs in direction from an electric field generated in other regions. This disturbance of an electric field produces a disturbance of the alignment state of the liquid crystal 50. As a result, a domain is produced in the liquid crystal 50, or the like, to cause a decrease in display quality of the liquid crystal device 1; however, in the present embodiment, this inconvenience may be avoided.

Figure 7:
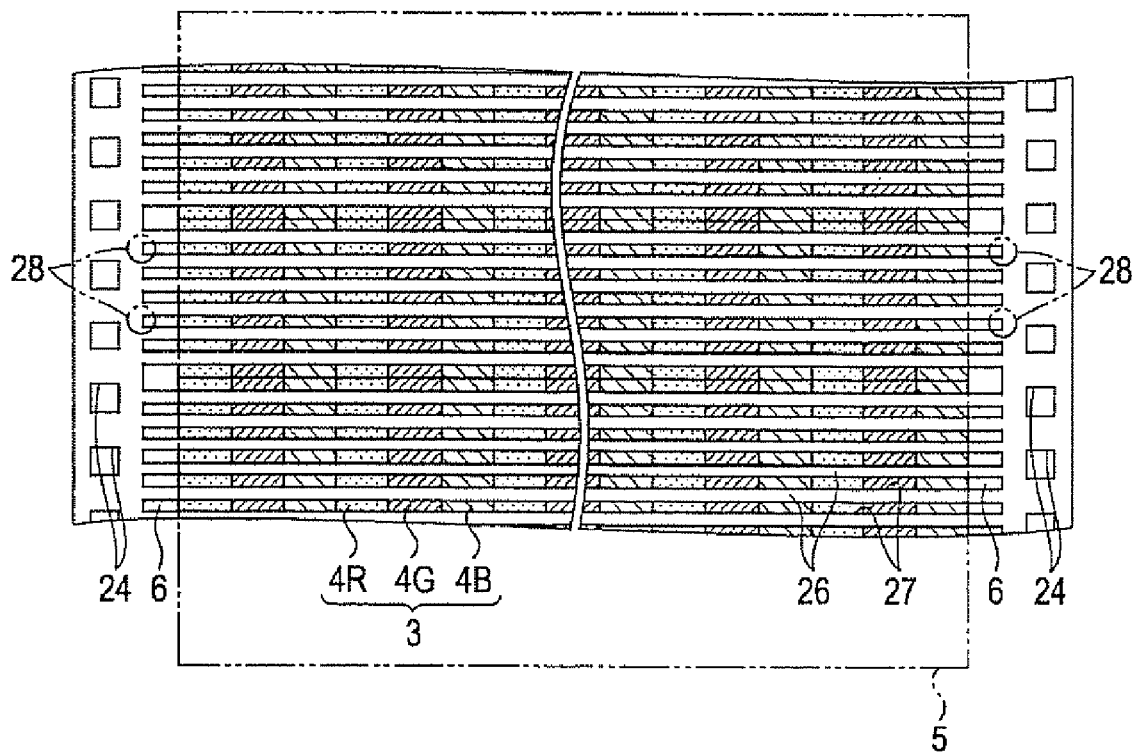
FIG. 7 is a plan view that shows the shape of the common electrode over the entire pixel region.

FIG. 7 is a plan view that shows the shape of the common electrode 26 over the entire pixel region 5. The slits 27 provided in the common electrode 26 extend continuously in the pixel region 5. That is, each of the slits 27 is formed to continuously extend from one end of the pixel region 5 to the other end opposite the one end. In addition, dummy pixels 6 are arranged adjacent to the pixel region 5 outside the pixel region 5, and the slits 27 are formed to continuously extend from the inside of the pixel region 5 to the dummy pixels 6. For this reason, the end portions 28 of the slits 27 are present only in the dummy pixels 6 and no end portions are present in the pixel region 5.

According to the above configuration, because there are no end portions 28 of the slits 27 that disturb the alignment state of the liquid crystal 50 in the pixel region 5, it is possible to suppress generation of a domain of the liquid crystal 50 in the pixel region 5 and also possible to improve the transmittance ratio. In addition, because there is no end portions 28 of the slits 27 in each of the sub-pixels 4, the effective display area is the same among the sub-pixels 4 and the width of a region that does not contribute to display between the adjacent sub-pixels 4 (a region between adjacent pixels) is also the same. Thus, it is possible to prevent a decrease in display quality due to chrominance non-uniformity, roughness, or the like. Moreover, because there is no difference in disturbance of the alignment state of the liquid crystal 50 due to the end portions 28 of the slits 27 among the sub-pixels 4 corresponding to the same color, it is possible to prevent a decrease in display quality due to chrominance non-uniformity, roughness, or the like.

In addition, the common electrode 26 is electrically connected to a wiring that supplies a common electric potential through a contact hole 24, which is provided outside the pixel region 5. In this manner, without reducing the effective display area of the pixel region 5, it is possible to supply a common electric potential to the common electrode 26.

Second Embodiment

Next, a second embodiment will be described. The liquid crystal device 1 according to the present embodiment differs from that of the first embodiment in that the arrangement of the common electrode 26 and slits 27 and the configuration of the pixels 3 are modified, and the other portions are the same as those of the first embodiment. In the drawings used in the following description, the same reference numerals are assigned to the same components as those of the first embodiment, and the description thereof is omitted.

Figure 8:
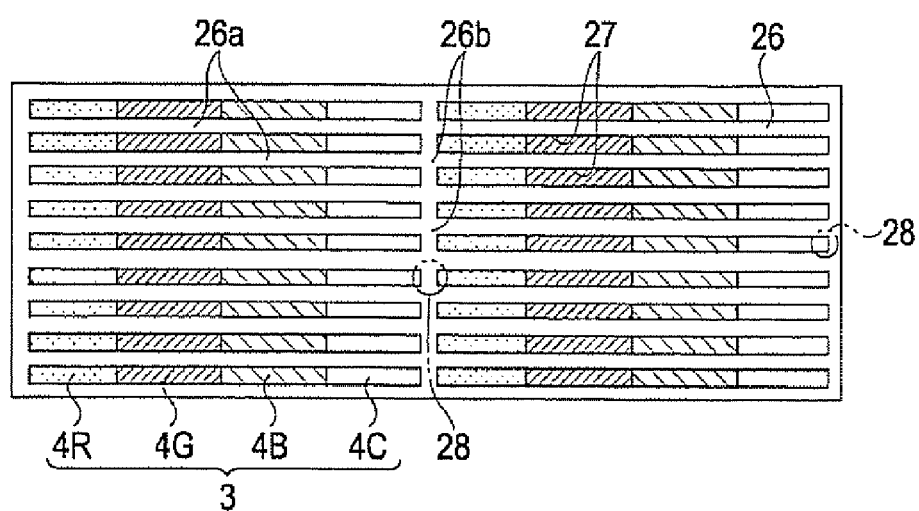
FIG. 8 is a plan view that specifically shows a portion corresponding to adjacent two pixels within the pixel region of a liquid crystal device according to a second embodiment.

FIG. 8 is a plan view that specifically shows a portion corresponding to adjacent two pixels 3 within the pixel region 5 of the liquid crystal device 1 according to the present embodiment. Each of the pixels 3 according to the present embodiment is configured so that four-color sub-pixels 4 are arranged along the longitudinal direction of the slits 27. More specifically, each of the pixels 3 is formed of sub-pixels 4R, 4G, 4B, 4C that contribute to display of red, green, blue, and cyan. Thus, color filters (not shown) of red, green, blue, and cyan are respectively formed at portions corresponding to the sub-pixels 4R, 4G, 4B, 4C on the opposite substrate 20*a*.

Nine slits 27 of the common electrode 26 are provided in each of the sub-pixels 4, and each of the slits 27 has a length that is substantially equal to the width of four sub-pixels 4. In other words, each of the slits 27 has a length that is substantially equal to the width of the pixel 3. In addition, the end portions 28 of the slits 27 are arranged so as to coincide with the boundary between the adjacent pixels 3. Accordingly, there are nine end portions 28 of the slits 27 respectively at one side of the sub-pixel 4R and at one side of the sub-pixel 4C, and there are no end portions 28 in the sub-pixels 4G, 4B. According to the above configuration, in comparison with the configuration in which the slits 27 are provided separately for each sub-pixel 4, it is possible to reduce the number of end portions 28 of the slits 27 that disturb the alignment state of the liquid crystal 50. In this manner, it is possible to reduce the area in which a domain is produced and, hence, the transmittance ratio of the liquid crystal device 1 may be improved.

Furthermore, the number of end portions 28 of the slits included in the sub-pixels 4R, 4G, 4B, 4C are respectively 9, 0, 0, 9, and this characteristic is the same among all the pixels 3. Thus, the number of end portions 28 included in each of the sub-pixels 4 corresponding to the same color is equal. According to the above configuration, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

In the meantime, the common electrode 26 may be regarded as an electrode that is formed of strip portions 26*a* and connecting portions 26*b*. The strip portions 26*a* are parallel to the short side of the sub-pixel 4 (parallel to the longitudinal direction of the slits 27, that is, parallel to the horizontal array direction (row direction or extending direction of the short side) in which the plurality of sub-pixels 4 are arranged in a matrix. The connecting portions 26*b* connect the adjacent strip portions 26*a*. In view of this point, the slits 27 are opening portions that are surrounded by the strip portions 26*a* and the connecting portions 26*b*, and the end portions 28 of the slits 27 correspond to portions in proximity to the connecting portions 26*b*. In addition, the end portions 28 of the slits 27 are arranged so as to coincide with the boundary between the adjacent pixels 3. This corresponds to that the connecting portions 26*b* are arranged at the boundary between the adjacent pixels 3. In FIG. 8, the connecting portions 26*b* are provided only at the boundary between the adjacent pixels 3 and are continuously arranged at right and left sides of each pixel 3. In other words, the slits 27 continuously extend across all the sub-pixels 4 included in each of the pixels 3 but do not continuously extend to the adjacent pixels 3. Therefore, each of the pixels 3 is configured to include the slits 27, each of which has four sides that are surrounded by the members of the common electrode 26 (the strip portions 26*a* or the connecting portions 26*b*) and which are separately formed in each of the pixels 3. Thus, the layout of the members, including the common electrode 26, in the pixel region 5 is configured so that the pixel 3 is set as a minimum unit for repeated arrangement. Thus, the number of end portions 28 of the slits 27 included in each of the pixels 3 is reduced to improve the transmittance ratio and/or improve the display quality, while making it possible to easily design the pixel region 5.

Note that, in the above description, each of the pixels 3 is formed of the sub-pixels 4R, 4G, 4B, 4C that are arranged in a horizontal line; however, the arrangement of the four-color sub-pixels 4 is not limited to it. For example, the sub-pixels 4R, 4G, 4B, 4C may be arranged in a two-by-two matrix. In this case, the sub-pixels 4R, 4G are repeatedly arranged in one pixel line, and the sub-pixels 4B, 4C are repeatedly arranged in the upper and lower pixel lines relative to the one pixel line. In this case, the length of the slits 27 may be equal to the width of two sub-pixels 4. In this manner, each of the sub-pixels 4 includes nine end portions 28 of the slits 27. Thus, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

In addition, the configuration in which four colors corresponding to red, green, blue, and cyan are displayed is described; however, a combination of four colors may be changed, or a configuration in which five or more colors are displayed may be employed. An example of another combination of four colors may be four colors corresponding to red, yellowish green, blue, and emerald green. Other than the above, it may be selected so that a combination of four colors consisting of a display of blue-based hue, a display of red-based hue, and displays of two kinds of hues selected from the hues ranging from blue to yellow, among a visible light region (380 to 780 nm) in which the hue varies on the basis of a wavelength. Here, the word "based" is used; for example, blue-based color is not limited to the hue of pure blue, but it also includes bluish purple, greenish blue, and the like. In addition, red-based hue is not limited to red, but it includes orange. When each of the pixels 3 is formed of five or more color (that is, five or more) sub-pixels 4, the length of the slits 27 may be substantially equal to the width of five sub-pixels 4.

Third Embodiment

Next, a third embodiment will be described. The present embodiment also differs from the first embodiment in that the arrangement of the common electrode 26 and slits 27 and the configuration of the pixels 3 are modified, and the other portions are the same as those of the first embodiment.

Figure 9:
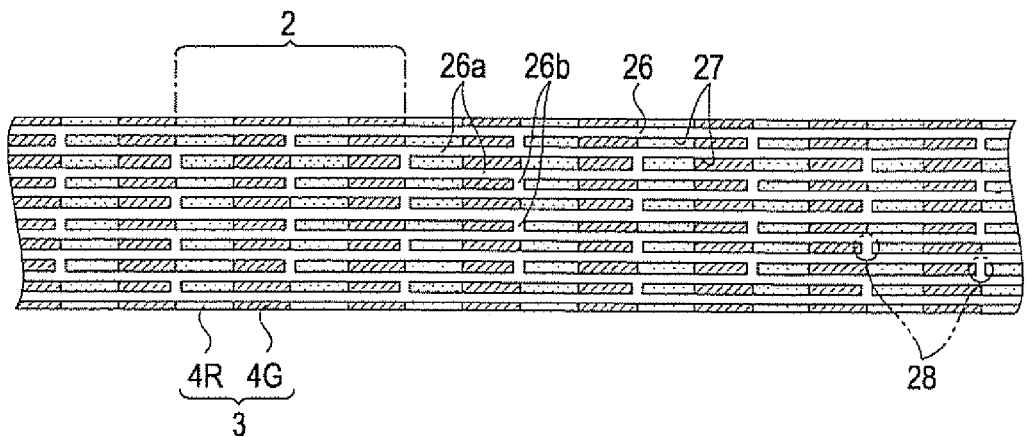
FIG. 9 is a plan view that specifically shows a portion of the pixel region of a liquid crystal device according to a third embodiment.

FIG. 9 is a plan view that specifically shows a portion of the pixel region 5 of the liquid crystal device 1 according to the present embodiment. Each of the pixels 3 in this drawing is configured so that two-color sub-pixels 4 are arranged along the longitudinal direction of the slits 27. More specifically, each of the pixels 3 is formed of sub-pixels 4R, 4G that contribute to displays of red and green.

In the present embodiment, a set of two pixels 3 that are arranged along the longitudinal direction of the slits 27 is termed as a pixel block 2. The layout of the pixel region 5, including the patterns of the common electrode 26 and slits 27, is configured so that the pixel block 2 is set as a minimum unit for repeated arrangement.

Nine strip portions 26a of the common electrode 26 are provided for each of the sub-pixels 4. Thus, eight slits 27 that are interposed between the adjacent strip portions 26a are provided for each of the sub-pixels 4. Each of the slits 27 has a length that is substantially equal to the width of the pixel block 2. Because each of the pixel blocks 2 is formed of four sub-pixels 4, the length of each slit 27 is substantially equal to the width of four sub-pixels 4. In addition, the end portions 28 of the slits 27 are arranged so as to coincide with the boundary between the adjacent pixels 3. Then, the adjacent slits 27 that are arranged in a vertical direction in FIG. 9 are arranged so that the positions of the end portions 28 are offset in the row direction by the width of one pixel 3. In other words, at least the end portions 28 of the two slits 27 that are provided for the pixel 3 and arranged adjacent to each other in the vertical direction are included in each of the pixels 3, and the end portions 28 are located at the right or left sides of the pixel 3.

When the slits 27 are arranged as described above, each of the sub-pixels 4R, 4G includes four end portions of the slits 27. Here, a product of m (=2), which is the number of pixels 3 included in each of the pixel blocks 2, and n (=4), which is the maximum number of end portions 28 of the slits 27 included in each of the sub-pixels 4, is equal to the number (=8) of slits 27 formed in each of the sub-pixels 4. On the other hand, when the number of slits 27 formed in each of the sub-pixels 4 is set to m×n (that is, the number of strip portions 26a formed in each of the sub-pixels 4 is set to m×n+1), the above described arrangement may be implemented.

Here, the arrangement of the strip portions 26a and connecting portions 26b, both of which constitute the common electrode 26, will be specifically described. As described above, in each of the pixels 3, nine strip portions 26a are arranged to extend along the row direction. In addition, in each of the pixels 3, four connecting portions 26b are arranged in a region of boundary with one pixel arranged adjacent to each other in the row direction, and four connecting portions 26b are also arranged in a region of boundary with the other pixel 3 arranged adjacent to each other in the row direction. When focusing on one slit 27 included in each of the pixels 3, the connecting portion 26b is arranged only on one side of the above boundary region. In addition, the connecting portion 26b and the closest other connecting portion 26b in the column direction at least interpose one slit 27 therebetween. In FIG. 9, each of the connecting portions 26b is provided in correspondence with every other slit 27. In addition, two connecting portions 26b that are located at one pixel distance from each other in the row direction are arranged offset in the column direction by a pitch of arrangement of the slits 27. Accordingly, each of the pixels 3 includes eight connecting portions 26b. The number of connecting portions 26b included in each of the pixels 3, where the number of strip portions 26a included in each of the pixels 3 is p (=9) and the number of sub-pixels 4 included in each of the pixels 3 is q (=2), is smaller than (p−1)×(q+1) (=24).

According to the above arrangement, by reducing the number of connecting portions 26b (the number of end portions 28) included in each of the pixels 3, it is possible to suppress a disturbance of an electric field in the pixels 3 and, hence, possible to improve the display quality. In addition, the number of end portions 28 included in each of the sub-pixels 4 corresponding to the same color is equal. Moreover, because there is no difference in disturbance of the alignment state of the liquid crystal 50 due to the end portions 28 of the slits 27 among the sub-pixels 4 corresponding to the same color, it is possible to prevent a decrease in display quality due to chrominance non-uniformity, roughness, or the like.

Moreover, the positions of the end portions 28 of the slits 27 that are located adjacent to each other in the vertical direction are configured to be offset in the row direction by one pixel, so that, between the adjacent pixels 3, it is less likely to abruptly change a position at which a domain of the liquid crystal 50 is produced. Thus, it is possible to prevent a decrease in display quality due to chrominance non-uniformity, roughness, or the like.

Figure 10:
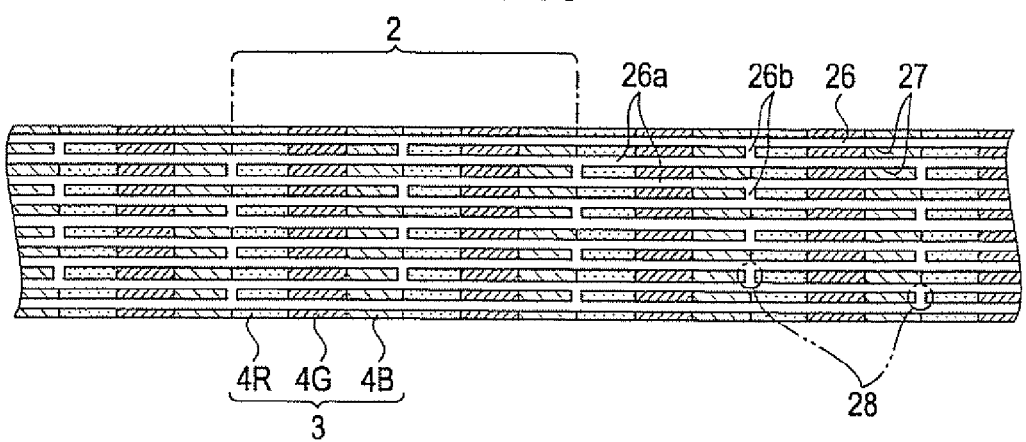
FIG. 10 is a plan view that specifically shows a portion of the pixel region of the liquid crystal device according to the third embodiment.

Note that, in the above description, each of the pixels 3 is formed of two-color sub-pixels 4R, 4G; however, in place of the above configuration, for example, each of the pixels 3 may be formed of three-color sub-pixels 4R, 4G, 4B, as shown in FIG. 10. In this case, there are four end portions 28 of the slits 27 respectively at one side of each sub-pixel 4R and at one side of each sub-pixel 4B, and there are no end portions 28 in each sub-pixel 4G. Further-more, the number of end portions 28 of the slits included in the sub-pixels 4R, 4G, 4B are respectively 4, 0, 4, and this characteristic is the same among all the pixels 3. Thus, the number of end portions 28 included in each of the sub-pixels 4 corresponding to the same color is equal.

In this case as well, each of the pixels 3 includes eight connecting portions 26b. The number of connecting portions 26b included in each of the pixels 3, where the number of strip portions 26a included in each of the pixels 3 is p (=9) and the number of sub-pixels 4 included in each of the pixels 3 is q (=3), is smaller than (p−1)×(q+1) (=32).

According to the above configuration, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

Fourth Embodiment

Next, a fourth embodiment will be described. The present embodiment also differs from the third embodiment in that the arrangement of the common electrode 26 and slits 27 and the configuration of the pixels 3 are modified, and the other portions are the same as those of the third embodiment.

Figure 11:
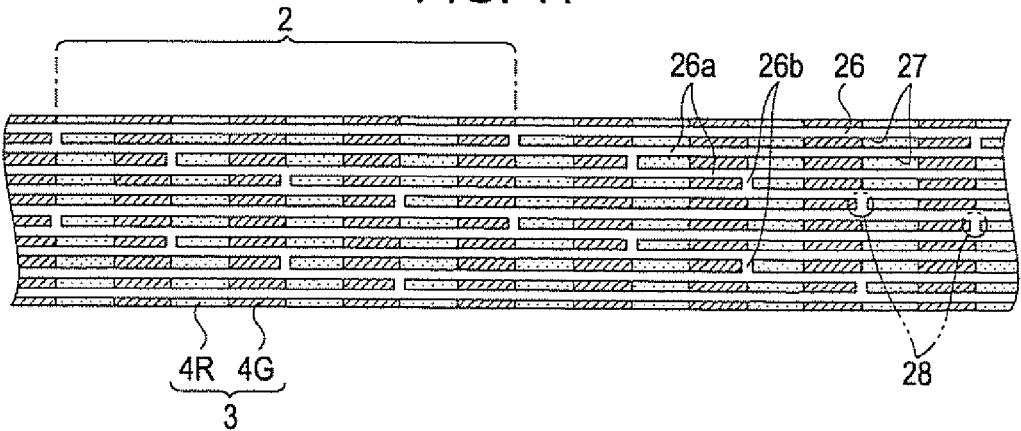
FIG. 11 is a plan view that specifically shows a portion of the pixel region of a liquid crystal device according to a fourth embodiment.

FIG. 11 is a plan view that specifically shows a portion of the pixel region 5 of the liquid crystal device 1 according to the present embodiment. Each of the pixels 3 in this drawing is configured so that two-color sub-pixels 4 are arranged along the longitudinal direction of the slits 27. More specifically, each of the pixels 3 is formed of sub-pixels 4R, 4G that contribute to displays of red and green.

In the present embodiment, a set of four pixels 3 that are arranged along the longitudinal direction of the slits 27 is termed as a pixel block 2. The layout of the pixel region 5, including the patterns of the common electrode 26 and slits 27, is configured so that the pixel block 2 is set as a minimum unit for repeated arrangement.

Nine strip portions 26a of the common electrode 26 are provided for each of the sub-pixels 4. Thus, eight slits 27 that are interposed between the adjacent strip portions 26a are provided for each of the sub-pixels 4. Each of the slits 27 has a length that is substantially equal to the width of the pixel block 2. Because each of the pixel blocks 2 is formed of eight sub-pixels 4, the length of each slit 27 is substantially equal to the width of eight sub-pixels 4. In addition, the end portions 28 of the slits 27 are arranged so as to coincide with the boundary between the adjacent pixels 3. Then, the adjacent slits 27 that are arranged in a vertical direction in FIG. 11 are arranged so that the positions of the end portions 28 are offset in the row direction by the width of one pixel 3. In other words, at least the end portions 28 of the two slits 27 that are provided for the pixel 3 and arranged adjacent to each other in the vertical direction are included in each of the pixels 3, and the end portions 28 are located at the right or left sides of the pixel 3.

When the slits 27 are arranged as described above, each of the sub-pixels 4R, 4G includes two end portions of the slits 27. Here, as in the case of the third embodiment, a product of m (=4), which is the number of pixels 3 included in each of the pixel blocks 2, and n (=2), which is the maximum number of end portions 28 of the slits 27 included in each of the sub-pixels 4, is equal to the number (=8) of slits 27 formed in each of the sub-pixels 4.

Here, the arrangement of the strip portions 26a and connecting portions 26b, both of which constitute the common electrode 26, will be specifically described. As described above, in each of the pixels 3, nine strip portions 26a are arranged to extend along the row direction. In addition, in each of the pixels 3, two connecting portions 26b are arranged in a region of boundary with one pixel arranged adjacent to each other in the row direction, and two connecting portions 26b are also arranged in a region of boundary with the other pixel 3 arranged adjacent to each other in the row direction. When focusing on one slit 27 included in each of the pixels 3, the connecting portion 26b is arranged at most only on one side of the above boundary region. In addition, the connecting portion 26b and the closest other connecting portion 26b in the column direction at least interpose one slit 27 therebetween. In FIG. 11, the connecting portions 26b are arranged in the column direction so as to interpose three slits 27 between the adjacent connecting portions 26b. In addition, two connecting portions 26b that are located at one pixel distance from each other in the row direction are arranged offset in the column direction by a pitch of arrangement of the slits 27. Accordingly, each of the pixels 3 includes four connecting portions 26b. The number of connecting portions 26b included in each of the pixels 3, where the number of strip portions 26a included in each of the pixels 3 is p (=9) and the number of sub-pixels 4 included in each of the pixels 3 is q (=2), is smaller than (p−1)×(q+1) (=24).

According to the above arrangement, by reducing the number of connecting portions 26b (the number of end portions 28) included in each of the pixels 3, it is possible to suppress a disturbance of an electric field in the pixels 3 and, hence, possible to improve the display quality. In addition, the number of end portions 28 included in each of the sub-pixels 4 corresponding to the same color is equal. Thus, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

Figure 12:
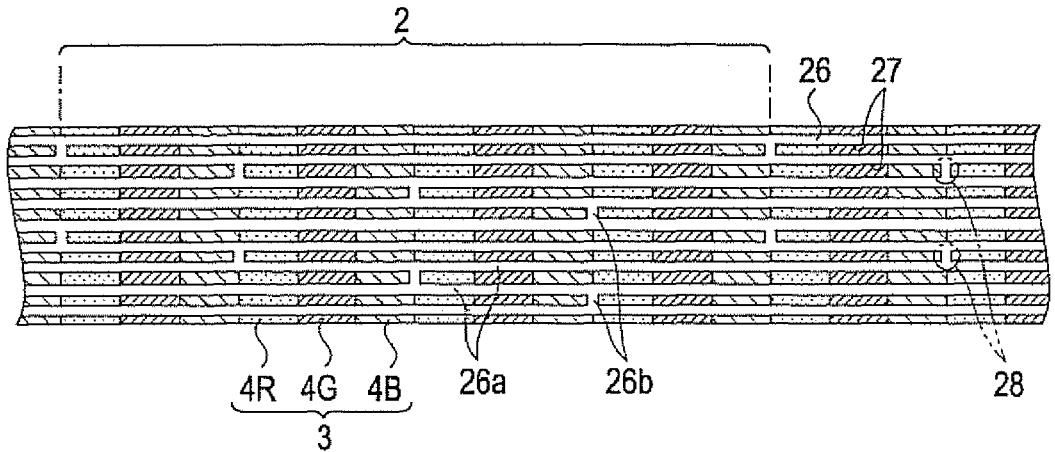
FIG. 12 is a plan view that specifically shows a portion of the pixel region of the liquid crystal device according to the fourth embodiment.

Note that, in the above description, each of the pixels 3 is formed of two-color sub-pixels 4R, 4G; however, in place of the above configuration, for example, each of the pixels 3 is formed of three-color sub-pixels 4R, 4G, 4B, as shown in FIG. 12. In this case, there are two end portions 28 of the slits 27 respectively at one side of each sub-pixel 4R and at one side of each sub-pixel 4B, and there are no end portions 28 in each sub-pixel 4G. Furthermore, the number of end portions 28 of the slits included in the sub-pixels 4R, 4G, 4B are respectively 2, 0, 2, and this characteristic is the same among all the pixels 3. Thus, the number of end portions 28 included in each of the sub-pixels 4 corresponding to the same color is equal.

In this case as well, each of the pixels 3 includes four connecting portions 26b. The number of connecting portions 26b included in each of the pixels 3, where the number of strip portions 26a included in each of the pixels 3 is p (=9) and the number of sub-pixels 4 included in each of the pixels 3 is q (=3), is smaller than (p−1)×(q+1) (=32).

According to the above configuration, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

Fifth Embodiment

Next, a fifth embodiment will be described. The present embodiment also differs from the fourth embodiment in that the arrangement of the common electrode 26 and slits 27 and the configuration of the pixels 3 are modified, and the other portions are the same as those of the fourth embodiment.

Figure 13:
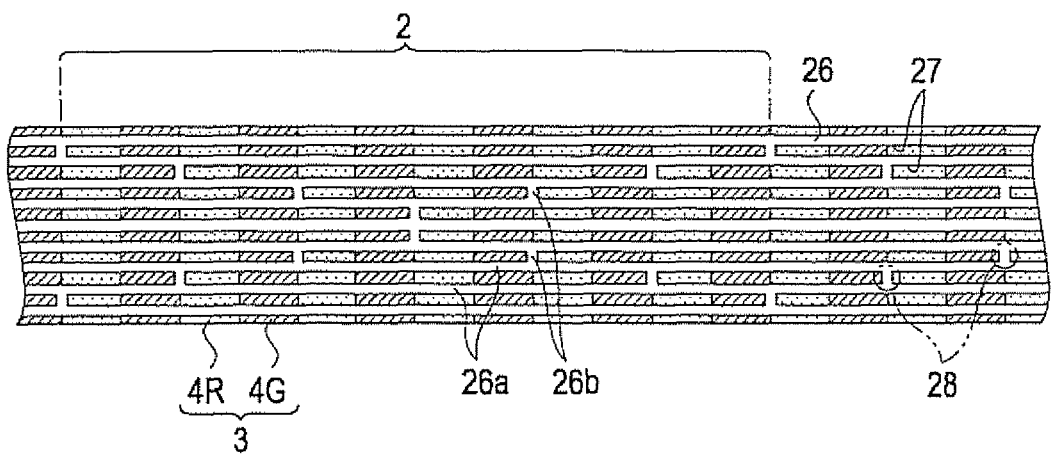
FIG. 13 is a plan view that specifically shows a portion of the pixel region of a liquid crystal device according to a fifth embodiment.

FIG. 13 is a plan view that specifically shows a portion of the pixel region 5 of the liquid crystal device 1 according to the present embodiment. Each of the pixels 3 in this drawing is configured so that two-color sub-pixels 4 are arranged along the longitudinal direction of the slits 27. More specifically, each of the pixels 3 is formed of sub-pixels 4R, 4G that contribute to displays of red and green.

In the present embodiment, a set of six pixels 3 that are arranged along the longitudinal direction of the slits 27 is termed as a pixel block 2. The layout of the pixel region 5, including the patterns of the common electrode 26 and slits 27, is configured so that the pixel block 2 is set as a minimum unit for repeated arrangement.

Nine strip portions 26a of the common electrode 26 are provided for each of the sub-pixels 4. Thus, eight slits 27 that are interposed between the adjacent strip portions 26a are provided for each of the sub-pixels 4. The end portions 28 of the slits 27 are arranged so as to coincide with the boundary between the adjacent pixels 3. Then, the arrangement positions of the end portions 28 of the slits 27 in each of the sub-pixels 4 are in symmetry in the vertical direction (a direction perpendicular to the longitudinal direction of the slits 27) in FIG. 13.

In this manner, when the slits 27 are arranged so that the end portions 28 are in vertical symmetry, domains of the liquid crystal 50 are not clustered on the upper or lower side of each sub-pixel 4. Thus, it is possible to prevent a decrease in display quality due to chrominance non-uniformity, roughness, or the like.

Furthermore, the adjacent slits 27 that are arranged in a vertical direction in FIG. 13 are arranged so that the positions of the end portions 28 are offset in the row direction by the width of one pixel 3. In other words, at least the end portions 28 of the two slits 27 that are provided for the pixel 3 and arranged adjacent to each other in the vertical direction are included in each of the pixels 3, and the end portions 28 are located at the right or left sides of the pixel 3.

According to the above arrangement, by reducing the number of connecting portions 26b (the number of end portions 28) included in each of the pixels 3, it is possible to suppress a disturbance of an electric field in the pixels 3 and, hence, possible to improve the display quality. In addition, between the adjacent pixels 3, it is less likely to abruptly change a position at which a domain of the liquid crystal 50 is produced. Thus, it is possible to prevent a decrease in display quality due to chrominance non-uniformity, roughness, or the like.

In addition, each of the sub-pixels 4R, 4G includes two end portions 28 of the slits 27, and the number of end portions 28 included in each of the sub-pixels 4 corresponding to the same color is equal. Thus, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

Figure 14:
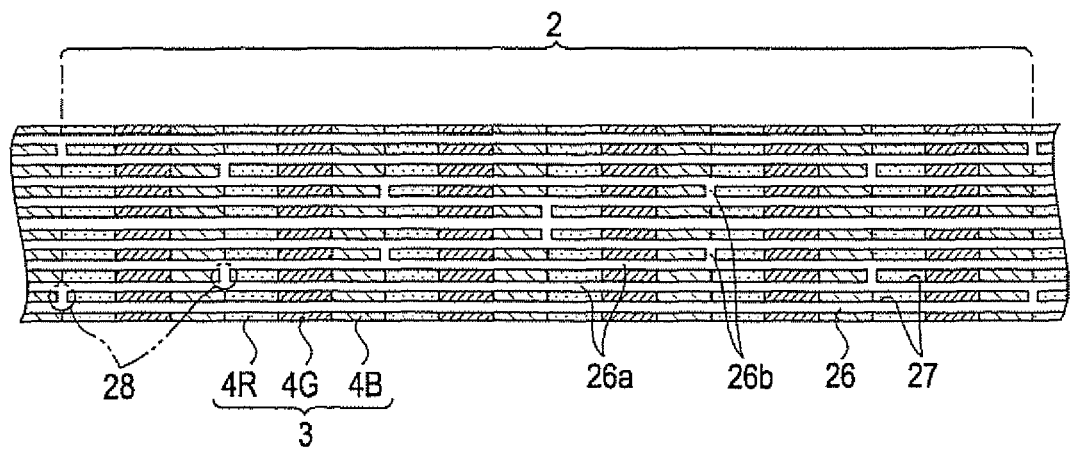
FIG. 14 is a plan view that specifically shows a portion of the pixel region of the liquid crystal device according to the fifth embodiment.

Note that, in the above description, each of the pixels 3 is formed of two-color sub-pixels 4R, 4G; however, in place of the above configuration, for example, each of the pixels 3 is formed of three-color sub-pixels 4R, 4G, 4B, as shown in FIG. 14. In this case, there are two end portions 28 of the slits 27 respectively at one side of each sub-pixel 4R and at one side of each sub-pixel 4B, and there are no end portions 28 in each sub-pixel 4G. Furthermore, the number of end portions 28 of the slits included in the sub-pixels 4R, 4G, 4B are respectively 2, 0, 2, and this characteristic is the same among all the pixels 3. Thus, the number of end portions 28 included in each of the sub-pixels 4 corresponding to the same color is equal. According to the above configuration, there is no difference in disturbance of the alignment state of the liquid crystal 50 due to the end portions 28 among the sub-pixels 4 corresponding to the same color. In addition, as in the case where each of the pixels 3 is formed of two-color sub-pixels 4R, 4G, the end portions 28 of the slits 27 are arranged in vertical symmetry, and the slits 27 arranged adjacent to each other in the vertical direction are arranged so that the end portions 28 are located offset in the row direction by one pixel. In this manner, it is possible to prevent a decrease in display quality due to chrominance non-uniformity, roughness, or the like.

Sixth Embodiment

Next, a sixth embodiment will be described. The present embodiment also differs from the first embodiment in that the arrangement of the common electrode 26 and slits 27 and the configuration of the pixels 3 are modified, and the other portions are the same as those of the first embodiment.

FIG. 15A to FIG. 15D are plan views that specifically show a portion of the pixel region 5 of the liquid crystal device 1 according to the present embodiment. Each of the pixels 3 in this drawing is formed of three-color sub-pixels 4R, 4G, 4B. In addition, in each of FIG. 11A to FIG. 15D, the slits 27 of the common electrode 26 are provided parallel to the long side of the sub-pixel 4. In other words, the slits 27 in each of the drawings are arranged parallel to a vertical array direction (the long side) in which the plurality of sub-pixels 4 are arranged in a matrix.

In FIG. 15A, each of the slits 27 has a length substantially equal to twice the long side of the sub-pixel 4 (that is, twice the width of the pixel 3 in the vertical direction), and the end portions 28 of the slits 27 that are arranged adjacent to each other in the horizontal direction in the drawing (a direction perpendicular to the longitudinal direction of the slits 27) are arranged offset by the width of one pixel 3. As a result, each of the sub-pixels 4R, 4G, 4B includes four end portions 28.

In FIG. 15B, each of the slits 27 has a length substantially equal to four times the long side of the sub-pixel 4 (that is, four times the width of the pixel 3 in the vertical direction), and the end portions 28 of the slits 27 that are arranged adjacent to each other in the horizontal direction in the drawing are arranged offset by the width of two pixels 3. As a result, each of the sub-pixels 4R, 4G, 4B includes two end portions 28.

In FIG. 15C, each of the slits 27 has a length that is substantially equal to the long side of the sub-pixel 4 (that is, the width of the pixel 3 in the vertical direction). In addition, the connecting portions 26b of the common electrode 26 are arranged to be continuous at the upper and lower sides of each pixel 3.

FIG. 15D, the slits 27 are continuous inside the pixel region 5 and have no end portions 28 in the pixel region 5. That is, the above configuration corresponds to a configuration that the configuration of FIG. 7 is modified by rotating only the common electrode 26 by 90 degrees.

According to the configurations of FIG. 15A to FIG. 15D, because there is no difference in disturbance of the alignment state of the liquid crystal 50 due to the end portions 28 among the sub-pixels 4 corresponding to the same color, it is possible to prevent a decrease in display quality due to chrominance non-uniformity, roughness, or the like.

Electronic Apparatus

Figure 17:
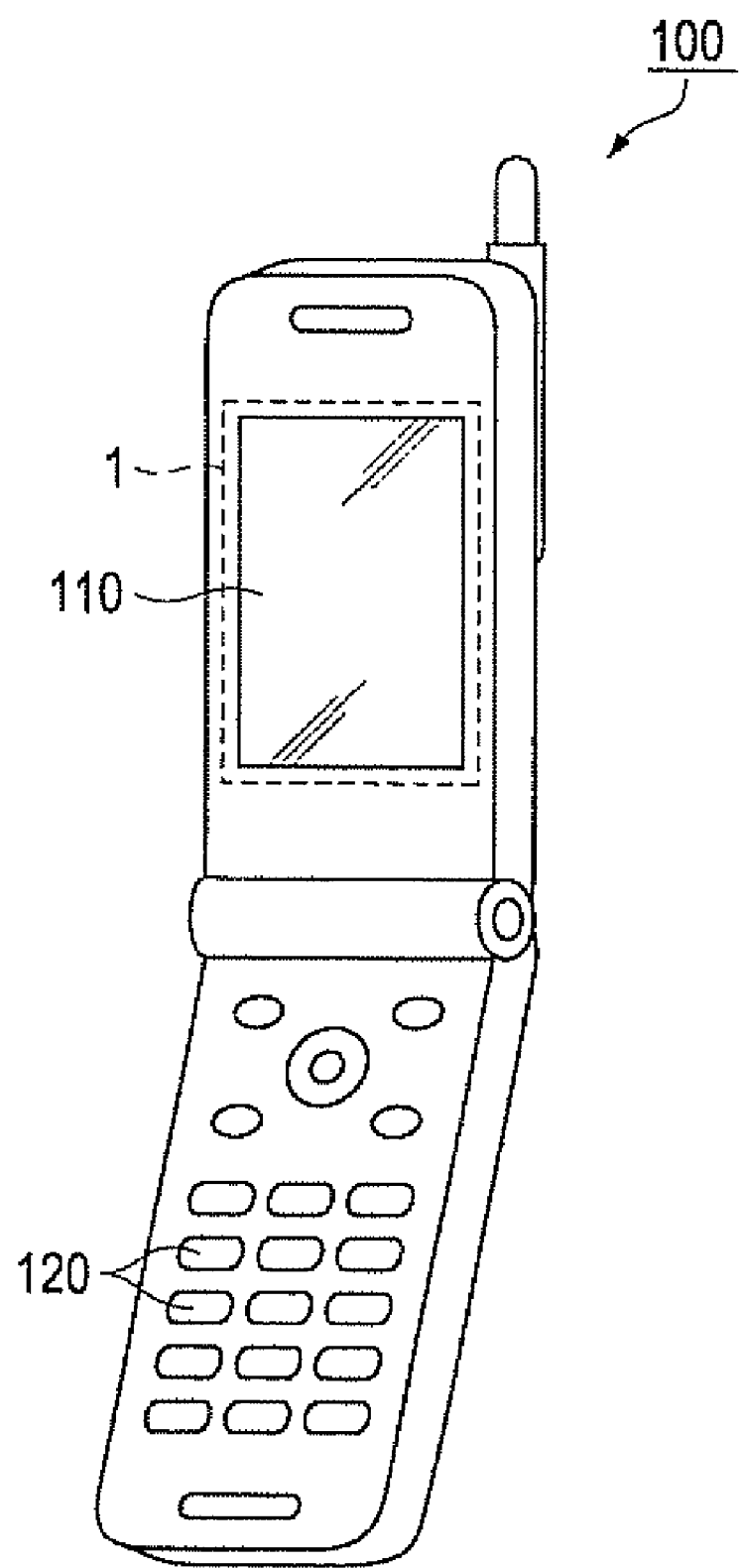
FIG. 17 is a perspective view of a cellular phone, which serves as an electronic apparatus.

The above described liquid crystal device 1 may be, for example, used for a cellular phone 100, which serves as an electronic apparatus, shown in FIG. 17. The cellular phone 100 has a display portion 110 and operation buttons 120. The display portion 110 is able to perform high-quality display without chrominance non-uniformity, roughness, or the like, in regard to various pieces of information, including data that are input by the operation buttons 120 and incoming information, by the built-in liquid crystal device 1.

Note that the liquid crystal device 1 may be used for various electronic apparatuses, such as a mobile computer, a digital camera, a digital video camera, an in-vehicle equipment, or an audio instrument, in addition to the above cellular phone 100.

The above described embodiments may be modified into various forms. For example, the following alternative embodiments are applicable.

First Alternative Embodiment

In the above third to fifth embodiments, each of the sub-pixels 4 includes eight slits 27; however, the aspects of the invention are not limited to it. It is only necessary that the number of slits 27 may be a product of the number n of the pixels 3 included in each of the pixel blocks 2 and the maximum number n of the end portions 28 of the slits 27 included in each of the sub-pixels 4, that is, m×n. According to the above configuration, as in the case of the above embodiments, it is possible to implement the arrangement in which the number of end portions 28 included in each of the sub-pixels 4 corresponding to the same color is equal.

Second Alternative Embodiment

Each of the sub-pixels 4 need not be rectangular. The shape of the sub-pixels 4 may be, for example, based on a rectangle, formed so that one pair of two opposite sides among four sides are made non-parallel to each other to form a trapezoid, any one of the four sides is curved, one of four corners of the rectangle is cutout, it is formed in a parallelogram, or the like.

Third Alternative Embodiment

The slits 27 need not be parallel to the sides of the sub-pixel 4. In this manner, the slits 27 are inclined relative to the direction of each side of the sub-pixel 4. For example, when the rubbing direction is parallel to any one of the sides of the sub-pixel 4, it is possible to align the rotational directions of the liquid crystal molecules 50a when a driving voltage is applied. In addition, each of the slits 27 at this time obliquely connects two opposite sides of the sub-pixel 4, so that the length is slightly greater than the length of one side of the sub-pixel 4.

Fourth Alternative Embodiment

In the above embodiments, the liquid crystal device 1 is described as one example of the electric field driving device, but the aspects of the invention are not limited to it. It is only necessary that the electric field driving device drives a material by an electric field generated by a difference in electric potential (driving voltage) applied between the pixel electrode 16 and the common electrode 26; the electric field driving device is not limited to the liquid crystal device.

Fifth Alternative Embodiment

Figure 16:
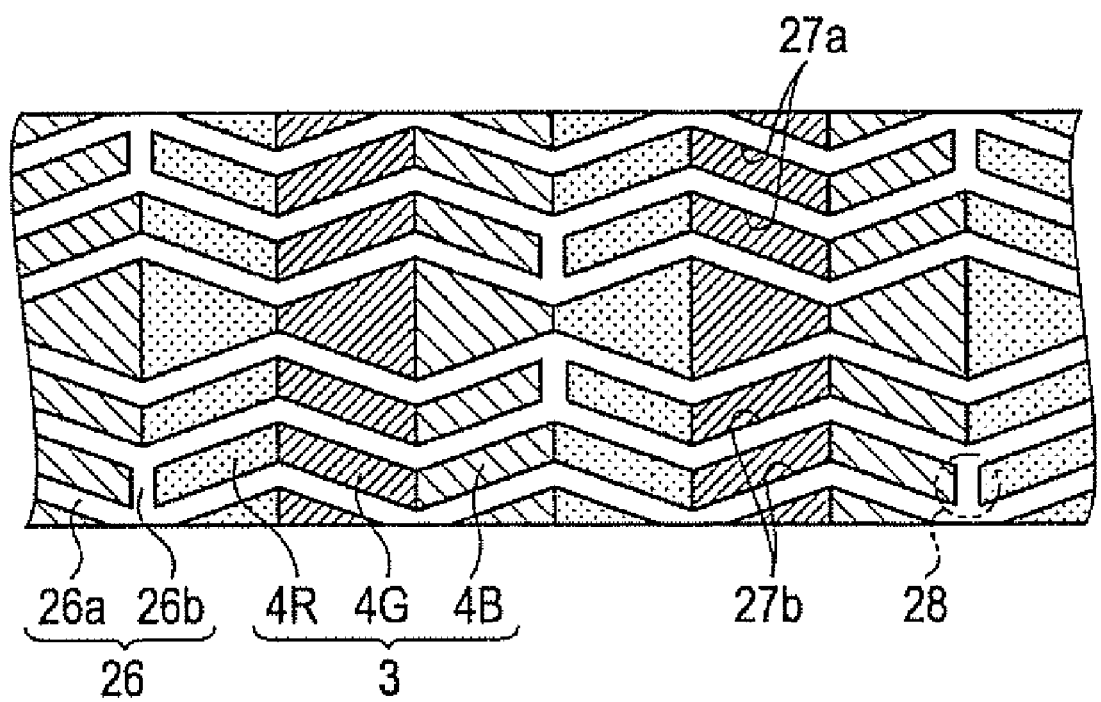
FIG. 16 is a plan view that specifically shows a portion of the pixel region of a liquid crystal device according to a fifth alternative embodiment.

The strip portions 26a or the slits 27 that form the common electrode 26 may be partly formed non-parallel to each other in the pixel 3 or in the sub-pixel 4. FIG. 16 is a plan view that specifically shows a portion of the pixel region 5 of the liquid crystal device 1 according to this alternative embodiment. In each of the pixels 3 or in each of the sub-pixels 4, slits 27a and slits 27b are non-parallel to each other. According to the above configuration as well, the number of end portions 28 included in each of the sub-pixels 4 corresponding to the same color is made equal, so that, as in the case of the above embodiments, it is possible to prevent a decrease in display quality due to chrominance non-uniformity, roughness, or the like.

Note that, in FIG. 16, the slits 27a or the slits 27b are parallel to one another; however, these may be non-parallel to one another, or the slits 27 included in the same pixel 3 or in the same sub-pixel 4 may be all non-parallel to one another.

What is claimed is:

1. An electric field driving device in which a plurality of pixels, each of which is formed of two or more sub-pixels that respectively correspond to different colors from one another, are arranged in a matrix in a pixel region on a substrate, comprising:
    a plurality of pixel electrodes, each of which is formed in correspondence with each of the two or more sub-pixels on the substrate;
    a common electrode that is formed above the plurality of pixel electrodes on the substrate so that at least part of the common electrode overlaps each of the plurality of pixel electrodes in plan view;
    an insulating layer that is formed on the substrate between the plurality of pixel electrodes and the common electrode; and
    a material that is driven by an electric field that is generated on the basis of a difference in electric potential between each of the plurality of pixel electrodes and the common electrode,
    the common electrode including a plurality of strip portions, a plurality of connecting portions, each of which connects adjacent strip portions of the plurality of strip portions, and a plurality of slits, each of which is surrounded by the plurality of strip portions and the plurality of connecting portions, at least a portion of the plurality of slits overlapping the plurality of pixel electrodes in plan view,
    the two or more sub-pixels in a pixel of the plurality of pixels being adjacent to each other without a connecting portion therebetween in plan view,
    same color ones of the two or more sub-pixels of different ones of the plurality of pixels including same numbers of the connecting portions, and
    a number of the connecting portions included in each of the plurality of pixels being smaller than (p−1)×(q+1), where the number of the plurality of strip portions included in the pixel is p and the number of the two or more sub-pixels included in the pixel is q.

2. An electronic apparatus comprising the electric field driving device according to claim 1 as a display portion.

3. The electric field driving device according to claim 1,
    each of the plurality of connecting portions extending between the adjacent strip portions of the plurality of strip portions in a connecting direction that is perpendicular to a direction in which the plurality of strip portions elongate; and
    for the plurality of strip portions, each of which being connected on both sides to one of the plurality of connecting portions in plan view, the plurality of connecting portions on one side being offset from the plurality of connecting portions on the other side.

* * * * *